Jan. 15, 1935.  W. BUTTE  1,988,160
FISHHOOK EXTRICATOR
Original Filed Aug. 8, 1931
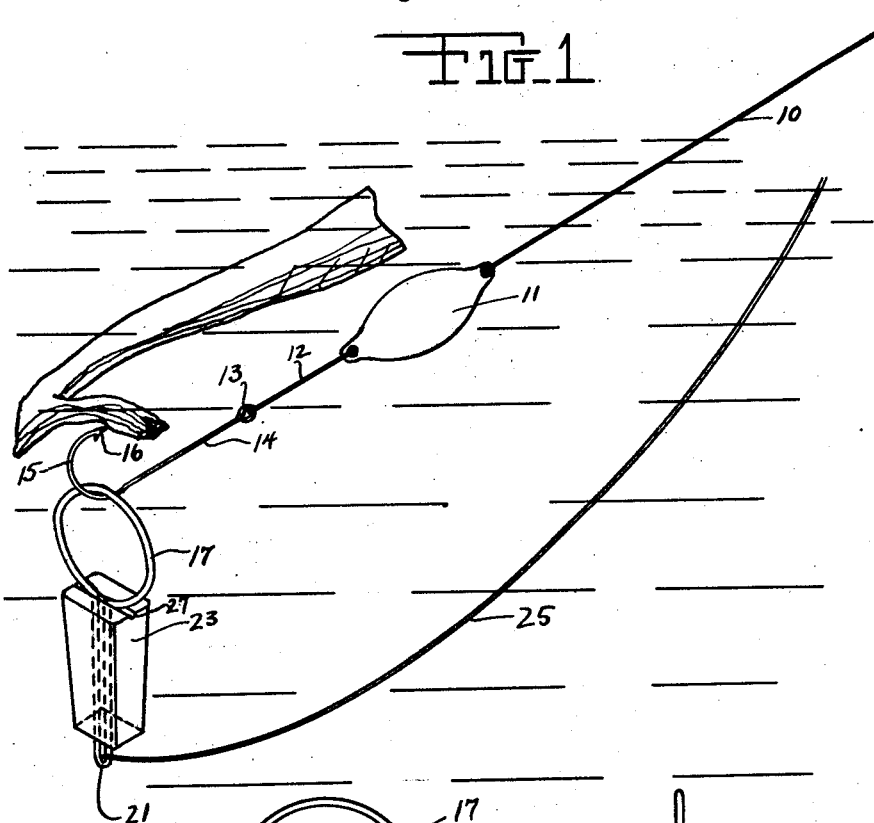
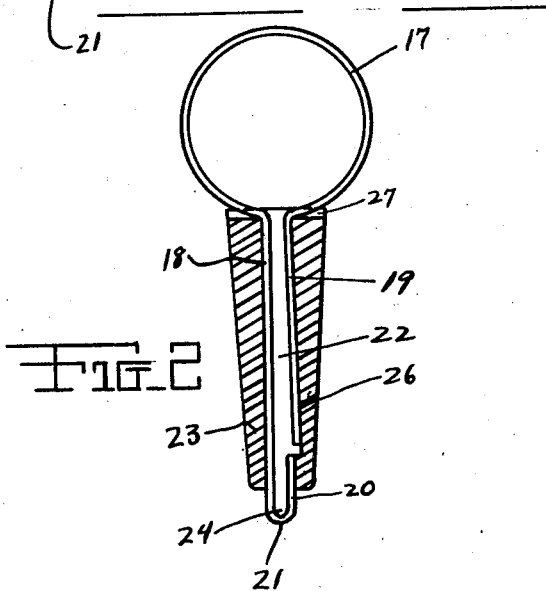
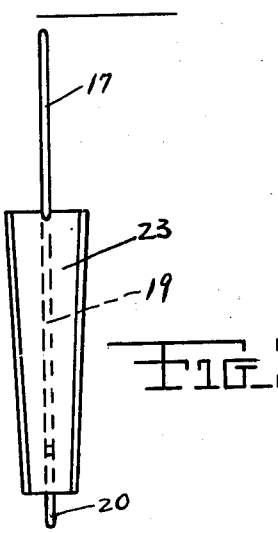
INVENTOR
W. Butte
BY his ATTORNEY F. Ledermann Patented Jan. 15, 1935

1,988,160

UNITED STATES PATENT OFFICE 1,988,160

FISHHOOK EXTRICATOR

William Butte, Brooklyn, N. Y.

Application August 8, 1931, Serial No. 555,940
Renewed June 20, 1934

1 Claim. (Cl. 43—30)

The main object of this invention is to extricate or detach a fishhook from an obstruction such as a tree, limb, seaweed, or other obstructions in fishing waters.

Another object of the invention is to provide an extricator which releases a fishhook from an obstruction or entanglement and so constructed as to be payed out on the line until it slips over the sinker and engages the fishhook to dislodge the same from the entanglement.

The above and other objects will become apparent in the description below in which characters of reference refer to like named parts in the drawing.

Referring briefly to the drawing, Figure 1 is a perspective view, showing a fishhook engaging an obstruction lodged upon the hook preparatory to releasing said hook.

Figure 2 is a longitudinal, sectional, elevational view of the extricator.

Figure 3 is an external, front elevational view of the extricator.

Referring in detail to the drawing, the numeral 10 indicates the conventional type of fishing line. Upon the end of the fishing line which is sunk in the stream, a sinker or weight 11 is suspended. A fishing tackle lead 12 is joined to the opposite end of the sinker and has attached thereto the eye 13 of a fishhook shank 14. The loop 15 of the fishhook has a barbed tip 16. The tip 16 of the fishhook very frequently becomes engaged with sunken tree limbs such as encountered in fresh water streams or with sea weed or mussel groups in salt waters. To extricate the fishhook and dislodge the same from these obstructions in unimpaired condition I propose to provide an extricator which comprises a ring 17 of sufficient size and dimension to slip over the cross section of the sinker 11. The ring has a pair of legs 18 and 19 thereon. The leg 19 is normally flexed outwardly and out of alignment with the extension 20 of a return bend or loop 21 continuing from the lower end of the leg 18. This normally outwardly flexed leg 19 and leg 18 and members 20 and 21 are inserted into a longitudinally extending channel 22 which is formed in a weight block 23. Grooves 27 in the top of the block 23 serve to seat the ring and prevent rotation of the block about the legs. In the bite 24 of the loop 21 one end of a guide string 25 is secured for purposes which will be more fully hereinafter described.

Should the hook become entangled with any type of obstruction it is possible with this type of extricator to dislodge and free the hook from the obstruction. In order to slip the ring 17 over the fish line 10, the legs 19 and 18 and members 20 and 21 are wholly extricated from the channel 22 and the line 10 is then inserted between the leg 19 and the extension 20 of the leg 18 and slipped upwardly into the confines of the ring 17. The legs 18 and 19 are then inserted into the channel 22 of the weight 23. The channel 22 is provided with a tapering communicating recess 26 in which the flexed leg 19 is harbored. Since this leg 19 flexes outwardly it frictionally engages the weight member 23 and retains the latter in properly mounted position upon the legs. The end of the lead line 25 is then attached to the bite 24 of the loop 21 and the ring 17 and the weight 23 are then allowed to slowly slide down upon the fish line 10. As the ring 17 encounters the sinker 11 it will be stopped and with a little joggling of the fishing line 10 or jerking the same sidewise, the ring 17 will pass over the sinker 11. Additional joggling will cause said ring to assume its most desirable position in the saddle or loop 15 of the fishing hook. Additional joggling and jerking of the line 10 will cause a sidewise tension upon the hook 14 and will consequently dislodge the hook from the obstruction it engages. After extraction should the extricator become dislodged or disengaged from the hook, which may infrequently occur, the lead line 25 will haul in the extricator independently while the fish hook may also be independently raised to the surface.

It is to be noted that certain changes in form and construction may be made without departing from the spirit and scope of the invention.

I claim:

A device of the class described comprising an elongated weighted block having a central longitudinal channel therein, the top of said block having aligned grooves extending from the upper end of said channel, a ring having a pair of substantially parallel resilient legs formed integrally and continuous with said ring, said legs extending into said channel and said ring seating in said grooves, said ring being adapted to be slipped over a fishing line, a loop at the foot of one of said legs adapted to receive the end of an auxiliary line, said loop projecting beyond the end of said block and being formed by a return bend of the extremity of said leg into said channel, said block having an upwardly-tapering recess communicating with said channel, the other of said legs being shorter than said looped leg and registering in said recess, said recess having a shoulder at its lower end at the base of said shorter leg.

WILLIAM BUTTE.